US012266471B2

(12) United States Patent
Xu et al.

(10) Patent No.: US 12,266,471 B2
(45) Date of Patent: Apr. 1, 2025

(54) METHOD AND DEVICE FOR WINDING FOIL COIL OF STEREOSCOPIC WOUND IRON CORE TRANSFORMER

(71) Applicants: HAIHONG ELECTRIC CO., LTD., Guangdong (CN); GUANGDONG TRITYPE ELECTRIC CO., LTD., Guangdong (CN)

(72) Inventors: Kaixuan Xu, Guangdong (CN); Qingning Liang, Guangdong (CN); Shuwei Situ, Guangdong (CN); Yuxiang Qi, Guangdong (CN); Danju Song, Guangdong (CN); Wenjie Fang, Guangdong (CN); Fei Li, Guangdong (CN); Xueming Zhang, Guangdong (CN); Yucheng Zhou, Guangdong (CN); Wenhui Fang, Guangdong (CN); Lizhen Zhai, Guangdong (CN)

(73) Assignees: HAIHONG ELECTRIC CO., LTD., Guangdong (CN); GUANGDONG TRITYPE ELECTRIC CO., LTD., Guangdong (CN)

( * ) Notice: Subject to any disclaimer, the term of this patent is extended or adjusted under 35 U.S.C. 154(b) by 0 days.

(21) Appl. No.: 17/640,026

(22) PCT Filed: Nov. 10, 2021

(86) PCT No.: PCT/CN2021/129878
§ 371 (c)(1),
(2) Date: Mar. 3, 2022

(87) PCT Pub. No.: WO2022/252499
PCT Pub. Date: Dec. 8, 2022

(65) Prior Publication Data

US 2024/0096552 A1 Mar. 21, 2024

(30) Foreign Application Priority Data

May 31, 2021 (CN) ........................ 202110603134.2

(51) Int. Cl.
*H01F 7/06* (2006.01)
*H01F 41/063* (2016.01)
(Continued)

(52) U.S. Cl.
CPC ......... *H01F 41/063* (2016.01); *H01F 41/076* (2016.01); *H01F 41/094* (2016.01); *H01F 41/098* (2016.01)

(58) Field of Classification Search
CPC .... H01F 41/061; H01F 41/063; H01F 41/076; H01F 41/094; H01F 41/096; H01F 41/098
See application file for complete search history.

(56) References Cited

U.S. PATENT DOCUMENTS 12,106,894 B2 * 10/2024 Xu .......................... H01F 41/06
2009/0112351 A1 4/2009 Klatt
(Continued)

FOREIGN PATENT DOCUMENTS

CN 101444906 A 6/2009
CN 201256076 Y 6/2009
(Continued)

OTHER PUBLICATIONS

International Search Report and Written Opinions of the International Searching Authority issued for the PCT application No. PCT/CN2023/080821 mailed Feb. 23, 2022, with English translation.

(Continued)

*Primary Examiner* — Paul D Kim
(74) *Attorney, Agent, or Firm* — Renner, Otto, Boisselle & Sklar, LLP

(57) ABSTRACT

Disclosed are a method and device for winding a foil coil of a stereoscopic wound iron core transformer. The device includes a rotating assembly, a driving device and a plurality of loading assemblies; the rotating assembly is provided with a through hole matched with an iron core post, the rotating assembly is provided with a gear plate and a track ring around the through hole, and the gear plate and the track ring are fixedly connected by a fixing block; the loading assembly includes a cylinder and a tension device, and the cylinder is movably connected with the rotating assembly; and a driving end of the driving device is connected with the gear plate.

9 Claims, 6 Drawing Sheets

(51) Int. Cl.

| | |
|---|---|
| ***H01F 41/076*** | (2016.01) |
| ***H01F 41/094*** | (2016.01) |
| ***H01F 41/098*** | (2016.01) |

(56) References Cited

U.S. PATENT DOCUMENTS

| | | | | |
|---|---|---|---|---|
| 2014/0375414 | A1 * | 12/2014 | Xu | H01F 3/04 336/233 |
| 2016/0055970 | A1 | 2/2016 | Xu et al. | |
| 2019/0295762 | A1 * | 9/2019 | Xu | H01F 27/26 |

FOREIGN PATENT DOCUMENTS

| | | | |
|---|---|---|---|
| CN | 102682999 | A | 9/2012 |
| CN | 202771957 | U | 3/2013 |
| CN | 204117847 | U | 1/2015 |
| CN | 104576034 | A | 4/2015 |
| CN | 204809032 | U | 11/2015 |
| CN | 109859935 | A | 6/2019 |
| CN | 110853913 | A | 2/2020 |
| CN | 112233900 | A | 1/2021 |
| CN | 213242257 | U | 5/2021 |
| CN | 213935943 | U | 8/2021 |
| CN | 213935944 | U | 8/2021 |
| CN | 113345710 | A | 9/2021 |
| JP | S6173318 | A | 4/1986 |
| JP | H07297063 | A | 11/1995 |
| JP | 2018156974 | A | 10/2018 |

OTHER PUBLICATIONS

First Office Action of the family patent CN113345710A dated Oct. 22, 2021, with English translation.
First Search Report of the family patent CN113345710A dated Oct. 15, 2021, with English translation.
Supplementary Search Report of the family patent CN113345710A dated Dec. 29, 2021, with English translation.
First Office Action of the family patent JP2023533397A dated Aug. 9, 2023, with English translation.
Second Office Action of the family patent JP2023533397A dated Jan. 18, 2024, with English translation.
Decision of Rejection of the family patent JP2023533397A dated May 2, 2024, with English translation.

* cited by examiner

METHOD AND DEVICE FOR WINDING FOIL COIL OF STEREOSCOPIC WOUND IRON CORE TRANSFORMER

This application is a national stage filing under 35 U.S.C. § 371 of international application number PCT/CN2021/129878, filed Nov. 10, 2021, which claims priority to Chinese patent application No. 202110603134.2, filed May 31, 2021. The contents of these applications are incorporated herein by reference in their entirety.

TECHNICAL FIELD

The disclosure relates to the technical field of transformer production, and more particularly, to a method and device for winding a foil coil of a stereoscopic wound iron core transformer.

BACKGROUND

A stereoscopic wound iron core transformer is an energy-saving electric power transformer, which creatively reforms a laminated magnetic circuit structure and a three-phase layout of a traditional electric power transformer, and makes a performance of products more optimized. Due to structural characteristics of a stereoscopic wound iron core, it is impossible to use a similar winding sleeving method (which is namely a production process of sleeving a coil onto an iron core after finishing coil winding) for a laminated iron core structure, and a winding must be wound on the stereoscopic wound iron core through winding devices customized according to different products. At present, a common method for winding a foil winding of the stereoscopic wound iron core is to customize the winding devices according to iron cores and winding sizes of different products, and then wind the foil winding on the iron core through the winding device. This method for winding has many problems, such as a high investment in tooling equipment, a long production cycle, a reduced production efficiency, and more production processes. Moreover, this method for winding may cause an air gap between the foil winding and the iron core, which affects a heat dissipation performance and an anti-short circuit capability of the transformer.

SUMMARY

In order to solve the above problems, the disclosure aims to provide a method and device for winding a foil coil of a stereoscopic wound iron core transformer, so as to improve an automation degree of winding of the foil coil of the stereoscopic wound iron core transformer, reduce a production cost, and ensure a winding efficiency of the stereoscopic wound iron core transformer and a quality of the coil.

The technical solutions used in the disclosure to solve the problems are as follows.

In a first aspect of the disclosure, a method for winding a foil coil of a stereoscopic wound iron core transformer includes the following steps of: providing a stereoscopic wound iron core, wherein the stereoscopic wound iron core includes a plurality of iron core posts; providing an insulating layer, wherein the insulating layer is arranged on an outer wall of each of the iron core posts; providing a plurality of cylinders, wherein a foil conductor, an interlayer insulator and an end insulator are respectively wound on the plurality of cylinders; sleeving the rotating assembly outside the insulating layer; arranging the plurality of cylinders on the rotating assembly; fixing one end of each of the foil conductor, the interlayer insulator and the end insulator on the insulating layer; arranging an inner leading wire portion at one end of the foil conductor connected with the insulating layer; connecting and starting the driving device, wherein the driving device drives the rotating assembly to rotate, so as to drive the cylinder to rotate around the iron core post, and the foil conductor, the interlayer insulator and the end insulator are all wound on an outer wall of the insulating layer with the iron core post as a central axis to form a coil body; and arranging an outer leading wire portion at one end of the foil conductor far away from the inner leading wire portion.

The method for winding a foil coil of a stereoscopic wound iron core transformer above at least has the following beneficial effects. The rotating assembly is sleeved outside the iron core post, and drives the plurality of cylinders to perform a winding operation on the iron core post, which effectively reduces a gap between the coil body and the iron core post, so that not only a manually controlled process during winding of the foil coil is simplified, but also consumptions of copper material and insulating material are reduced and a production cost of the transformer is reduced. Meanwhile, a heat exchange efficiency between the coil body and the iron core post is improved, an anti-short circuit capability of the transformer is enhanced, a deformation amount of the coil body under a radial electromotive force is reduced, and a stability of the stereoscopic wound iron core transformer is improved. The rotating assembly and the cylinders can be suitable for the iron core posts of different sizes, thus effectively reducing accumulation of winding tooling devices, and shortening a production cycle of the stereoscopic wound iron core transformer.

Further, the insulating layer is wrapped or coated on the outer wall of the iron core post. This structure ensures that the insulating layer can be tightly attached to the iron core post, effectively controls the gap between the coil body and the iron core post, and also ensures an insulation performance between the coil body and the iron core post.

Further, a distance between an inner wall of the coil body and an outer wall of the insulating layer ranges from 0 mm to 1.5 mm. This structure is beneficial for improving the heat exchange efficiency between the coil body and the iron core post, and reducing temperature rise of the coil body of the stereoscopic wound iron core transformer. Meanwhile, the gap between the coil body and the iron core post is also effectively reduced, the anti-short circuit capability of the transformer is enhanced, the deformation amount of the coil body under the radial electromotive force is reduced, and the stability of the stereoscopic wound iron core transformer is improved.

Further, after sleeving the rotating assembly outside the insulating layer, a levelness of the rotating assembly is adjusted, and a rotation smoothness of the rotating assembly is checked; and the rotating assembly is fixed on an external device by a fixing block. By adjusting the levelness of the rotating assembly, the rotation smoothness of the rotating assembly is ensured, a winding material can be ensured to be wound on the iron core post at a specific angle, and a winding efficiency and a quality of the coil of the stereoscopic wound iron core transformer can be avoided from being affected by improper connection of the rotating assembly.

Further, the foil conductor, the interlayer insulator and the end insulator have a single-layer structure; and a number of the cylinders wound with the foil conductor, the interlayer insulator and the end insulator is adjusted according to a performance requirement of the coil body. By adjusting the number of the cylinders, winding thicknesses of the foil conductor, the interlayer insulator and the end insulator can be flexibly changed to meet the coil bodies with different performance requirements, so as to improve a production efficiency of the stereoscopic wound iron core transformer.

Further, the foil conductor, the interlayer insulator and the end insulator have a multi-layer structure; and numbers of layers of the foil conductor, the interlayer insulator and the end insulator are adjusted according to a performance requirement of the coil body. By adjusting the numbers of layers of the foil conductor, the interlayer insulator and the end insulator, the winding thicknesses of the foil conductor, the interlayer insulator and the end insulator can be flexibly changed to meet the coil bodies with different performance requirements, so as to improve the production efficiency of the stereoscopic wound iron core transformer.

In a second aspect of the disclosure, a device for winding a foil coil of a stereoscopic wound iron core transformer includes a rotating assembly, a driving device and a plurality of loading assemblies, wherein the rotating assembly is provided with a through hole matched with an iron core post, and the rotating assembly is provided with a gear plate and a track ring around the through hole; the gear plate and the track ring are fixedly connected by a fixing block; the loading assembly includes a cylinder and a tension device, and the cylinder is movably connected with the rotating assembly; and a driving end of the driving device is connected with the gear plate.

The device for winding a foil coil of a stereoscopic wound iron core transformer above at least has the following beneficial effects. By arranging the rotating assembly and the loading assemblies, a winding material wound on the cylinder can be stably and rapidly conveyed outwardly along with rotation of the gear plate, thus improving a loading stability and a winding efficiency of the device for winding a foil coil of a stereoscopic wound iron core transformer. By arranging the through hole, the rotating assembly is conveniently sleeved on the iron core post and performs a winding operation on the iron core post, thus improving a winding efficiency of the stereoscopic wound iron core transformer. By arranging the track ring and the tension device, displacement and dislocation of the cylinder during rotation are avoided, thus ensuring a quality of the coil, and improving an automation degree of winding of the foil coil of the stereoscopic wound iron core transformer.

Further, the tension device is located in the cylinder; the tension device includes a push rod, a spring and a friction block attached to the cylinder, and two ends of the spring are respectively attached to the push rod and the friction block. By arranging the spring and the friction block, when the cylinder rotates under drive of the gear plate, the friction block generates a friction force with the cylinder, and then the cylinder exerts a tension on the winding material, so as to avoid dislocation of the winding material, and ensure a loading stability of the device for winding a foil coil of a stereoscopic wound iron core transformer.

Further, at least one end of the cylinder is connected with the rotating assembly; and the cylinder is inserted into the gear plate through a connecting portion and movably connected with the rotating assembly. By arranging the connecting portion, a connection stability and disassembly convenience between the cylinder and the rotating assembly are improved, so as to ensure the loading stability of the device for winding a foil coil of a stereoscopic wound iron core transformer.

Further, the gear plate and the track ring both have an annular structure formed by combination of multiple parts. This structure is convenient for mounting and disassembling the rotating assembly, so as to improve use convenience of the device for winding a foil coil of a stereoscopic wound iron core transformer.

The device for winding a foil coil of a stereoscopic wound iron core transformer above has the beneficial effects as follows. By arranging the rotating assembly and the loading assemblies, the winding material wound on the cylinder can be stably and rapidly conveyed outwardly along with rotation of the gear plate, thus improving the loading stability and the winding efficiency of the device for winding a foil coil of a stereoscopic wound iron core transformer. By arranging the through hole, the rotating assembly is conveniently sleeved on the iron core post and performs the winding operation on the iron core post, thus improving the winding efficiency of the stereoscopic wound iron core transformer. By arranging the track ring and the tension device, displacement and dislocation of the cylinder during rotation are avoided, thus ensuring the quality of the coil, and improving the automation degree of winding of the foil coil of the stereoscopic wound iron core transformer. By arranging the spring and the friction block, when the cylinder rotates under drive of the gear plate, the friction block generates the friction force with the cylinder, and then the cylinder exerts the tension on the winding material, thus avoiding dislocation of the winding material and ensuring the loading stability of the device for winding a foil coil of a stereoscopic wound iron core transformer.

The additional aspects and advantages of the disclosure will be given in part in the following description, and will become apparent in part from the following description, or will be learned through the practice of the disclosure.

BRIEF DESCRIPTION OF THE DRAWINGS

The above and additional aspects and advantages of the disclosure will be apparent and easily understood from the descriptions of the embodiments with reference to the following accompanying drawings, wherein.

DETAILED DESCRIPTION

Figure 1:
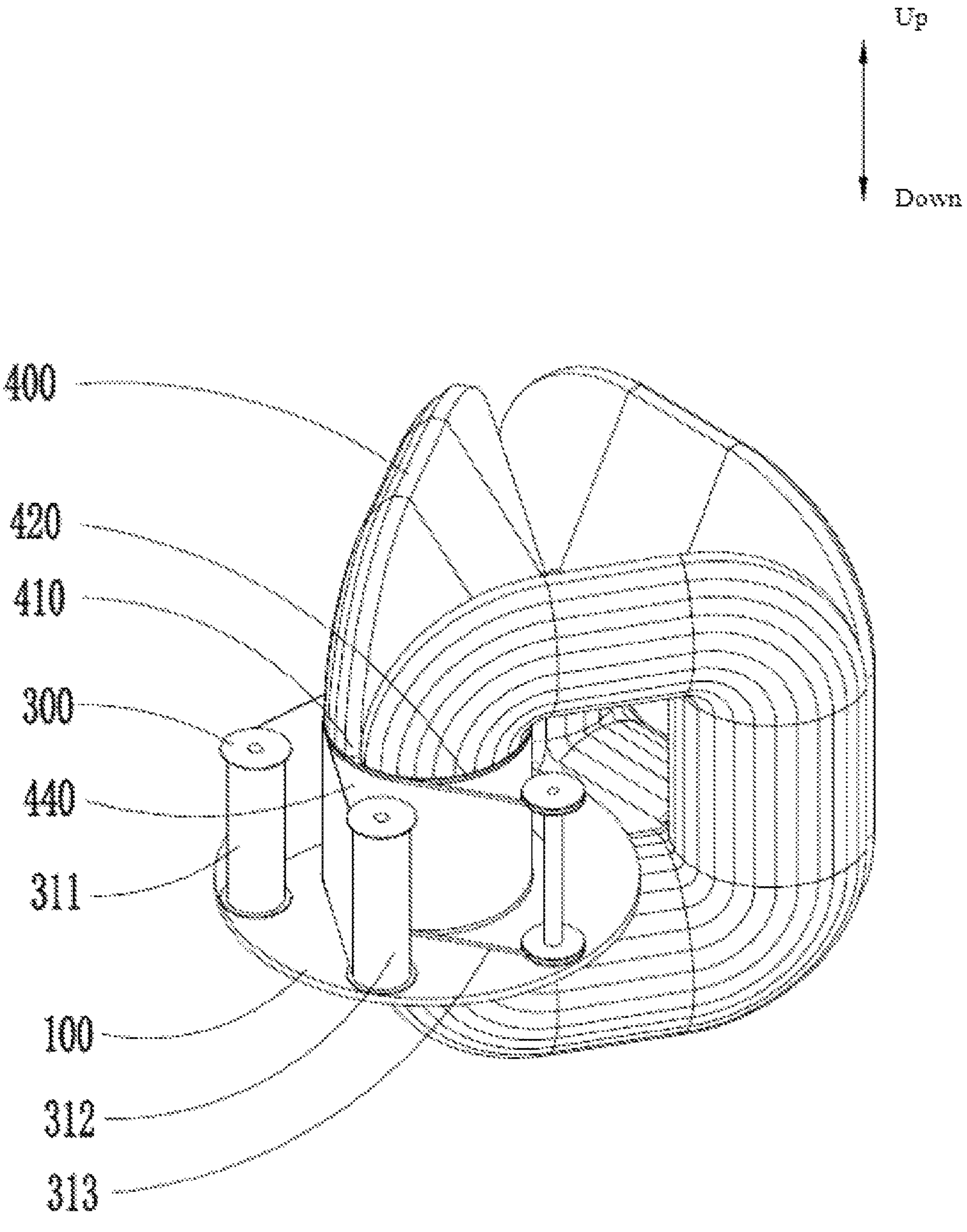
FIG. 1 is a structural diagram of a device for winding a foil coil of a stereoscopic wound iron core transformer according to an embodiment of the disclosure.

The embodiments of the disclosure are described in detail hereinafter, and examples of the embodiments are shown in the accompanying drawings, wherein the same or similar reference numerals throughout the accompanying drawings denote the same or similar elements or elements having the same or similar functions. The embodiments described hereinafter with reference to the accompanying drawings are exemplary, and are only intended to explain the disclosure, but should not be understood as limiting the disclosure.

In the description of the disclosure, it should be understood that the orientation or position relation related to the orientation description, such as the orientation or position relation indicated by "up", "down", "front", "rear", "left", "right", etc., is based on the orientation or position relation shown in the accompanying drawings, which is only used for convenience of description of the disclosure and simplification of description instead of indicating or implying that the indicated device or element must have a specific orientation, and be constructed and operated in a specific orientation, and thus should not be understood as a limitation to the disclosure.

In the description of the disclosure, "several" refers to being one or more, "multiple" refers to being more than two, and "greater than", "less than", "more than", etc. are understood as not including this number, while "above", "below", "within", etc. are understood as including this number. If there are descriptions of "first" and "second", it is only for the purpose of distinguishing technical features, and should not be understood as indicating or implying relative importance, implicitly indicating the number of the indicated technical features or implicitly indicating the order of the indicated technical features.

In the description of the disclosure, unless otherwise clearly defined, the terms "setting", "mounting", "connection", etc. should be understood broadly, and those skilled in the art can reasonably determine the specific meanings of the above terms in the disclosure in combination with the specific contents of the technical solutions.

An embodiment of the disclosure provides a method for winding a foil coil of a stereoscopic wound iron core transformer, which includes the following steps of: providing a stereoscopic wound iron core 400, wherein the stereoscopic wound iron core 400 includes a plurality of iron core posts 410; providing an insulating layer 420, wherein the insulating layer 420 is arranged on an outer wall of each of the iron core posts 410; providing a plurality of cylinders 310, wherein a foil conductor 311, an interlayer insulator 312 and an end insulator 313 are respectively wound on the plurality of cylinders 310; sleeving the rotating assembly 100 outside the insulating layer 420; arranging the plurality of cylinders 310 on the rotating assembly 100; fixing one end of each of the foil conductor 311, the interlayer insulator 312 and the end insulator 313 on the insulating layer 420; arranging an inner leading wire portion 430 at one end of the foil conductor 311 connected with the insulating layer 420; connecting and starting the driving device, wherein the driving device drives the rotating assembly 100 to rotate, so as to drive the cylinder 310 to rotate around the iron core post 410, and the foil conductor 311, the interlayer insulator 312 and the end insulator 313 are all wound on an outer wall of the insulating layer 420 with the iron core post 410 as a central axis to form a coil body 440; and arranging an outer leading wire portion 450 at one end of the foil conductor 311 far away from the inner leading wire portion 430.

The rotating assembly 100 is sleeved outside the iron core post 410, and drives the plurality of cylinders 310 to perform a winding operation on the iron core post 410, which effectively reduces a gap between the coil body 440 and the iron core post 410, so that not only a manually controlled process during winding of the foil coil is simplified, but also consumptions of copper material and insulating material are reduced and a production cost of the transformer is reduced. Meanwhile, a heat exchange efficiency between the coil body 440 and the iron core post 410 is improved, an anti-short circuit capability of the transformer is enhanced, a deformation amount of the coil body 440 under a radial electromotive force is reduced, and a stability of the stereoscopic wound iron core transformer is improved. The rotating assembly 100 and the cylinders 310 can be suitable for the iron core posts 410 of different sizes, thus effectively reducing accumulation of winding tooling devices, and shortening a production cycle of the stereoscopic wound iron core transformer.

In another embodiment, the insulating layer 420 is wrapped or coated on the outer wall of the iron core post 410. This structure ensures that the insulating layer 420 can be tightly attached to the iron core post 410, effectively controls the gap between the coil body 440 and the iron core post 410, and also ensures an insulation performance between the coil body 440 and the iron core post 410.

In another embodiment, a distance between an inner wall of the coil body 440 and an outer wall of the insulating layer 420 ranges from 0 mm to 1.5 mm. This structure is beneficial for improving the heat exchange efficiency between the coil body 440 and the iron core post 410, and reducing temperature rise of the coil body 440 of the stereoscopic wound iron core transformer. Meanwhile, the gap between the coil body 440 and the iron core post 410 is also effectively reduced, the anti-short circuit capability of the transformer is enhanced, the deformation amount of the coil body 440 under the radial electromotive force is reduced, and the stability of the stereoscopic wound iron core transformer is improved. In addition, this stereoscopic wound iron core transformer structure has an anti-short circuit capability, and it is unnecessary to fill a supporting member between the iron core post 410 and the coil body 440, which not only simplifies a production process, but also saves a material cost.

In another embodiment, after sleeving the rotating assembly 100 outside the insulating layer 420, a levelness of the rotating assembly 100 is adjusted, and a rotation smoothness of the rotating assembly 100 is checked. The rotating assembly 100 is fixed on an external device by a fixing block 140. By adjusting the levelness of the rotating assembly 100, the rotation smoothness of the rotating assembly 100 is ensured, a winding material can be ensured to be wound on the iron core post 410 at a specific angle, and a winding efficiency and a quality of the coil of the stereoscopic wound iron core transformer can be avoided from being affected by improper connection of the rotating assembly 100. In the embodiment, the fixing block 140 is provided with a mounting portion 141 for connecting an external device, which is convenient for positioning and mounting the rotating assembly 100 with respect to the external device.

In another embodiment, the foil conductor 311, the interlayer insulator 312 and the end insulator 313 have a single-layer structure; and a number of the cylinders 310 wound with the foil conductor 311, the interlayer insulator 312 and the end insulator 313 is adjusted according to a performance requirement of the coil body 440. By adjusting the number of the cylinders 310, winding thicknesses of the foil conductor 311, the interlayer insulator 312 and the end insulator 313 can be flexibly changed to meet the coil bodies 440 with different performance requirements, so as to improve a production efficiency of the stereoscopic wound iron core transformer.

In another embodiment, the foil conductor 311, the interlayer insulator 312 and the end insulator 313 have a multi-layer structure; and numbers of layers of the foil conductor 311, the interlayer insulator 312 and the end insulator 313 are adjusted according to a performance requirement of the coil body 440. By adjusting the number of layers of the foil conductor 311, the interlayer insulator 312 and the end insulator 313, the winding thicknesses of the foil conductor 311, the interlayer insulator 312 and the end insulator 313 can be flexibly changed to meet the coil bodies 440 with different performance requirements, so as to improve the production efficiency of the stereoscopic wound iron core transformer.

In other embodiments, the foil conductor 311, the interlayer insulator 312 and the end insulator 313 wound on the cylinders 310 are formed by one or more sheets, and a number of sheets of the winding material is adjusted according to a thickness and a performance requirement of the coil body 440. In this way, when winding the coil body 440 with a large rated current, a requirement of winding the thick foil conductor 311, which increases a winding difficulty of the coil body 440, can be avoided. The larger the thickness of the foil conductor 311 is, the more difficult the molding is, and the larger the size deviation of the foil conductor 311 is. By stacking multiple layers of foil conductor 311, quality problems such as coil outlet, burring and peeling caused by the thick foil conductor 311 can be effectively avoided, so as to ensure a winding quality of the stereoscopic wound iron core transformer.

In another embodiment, after arranging an outer leading wire portion 450, the coil body 440 should also be insulated, and production by winding of the foil coil of the stereoscopic wound iron core transformer are finished. For example, the insulating material is wound outside the outer leading wire portion 450 and the coil body 440, so as to ensure an insulating performance of the coil body 440, improve a protective performance of the foil coil during conveying and mounting, and avoid deformation and damage.

With reference to FIG. 1 to FIG. 4, an embodiment of the disclosure further provides a device for winding a foil coil of a stereoscopic wound iron core transformer, which includes a rotating assembly 100, a driving device and a plurality of loading assemblies 300. The rotating assembly 100 is provided with a through hole 110 matched with an iron core post 410, the rotating assembly 100 is provided with a gear plate 120 and a track ring 130 around the through hole 110, and the gear plate 120 and the track ring 130 are fixedly connected by a fixing block 140. The loading assembly 300 includes a cylinder 310 and a tension device 320, and the cylinder 310 is movably connected with the rotating assembly 100. A driving end of the driving device is connected with the gear plate 120.

By arranging the rotating assembly 100 and the loading assemblies 300, a winding material wound on the cylinder 310 can be stably and rapidly conveyed outwardly along with rotation of the gear plate 120, thus improving a loading stability and a winding efficiency of the device for winding a foil coil of a stereoscopic wound iron core transformer. By arranging the through hole 110, the rotating assembly 100 is conveniently sleeved on the iron core post 410 and performs a winding operation on the iron core post 410, thus improving a winding efficiency of the stereoscopic wound iron core transformer. By arranging the track ring 130 and the tension device 320, displacement and dislocation of the cylinder 310 during rotation are avoided, thus ensuring a quality of the coil, and improving an automation degree of winding of the foil coil of the stereoscopic wound iron core transformer.

In the embodiment, the driving end of the driving device can be in transmission connection with the gear plate 120 through a gear, a belt pulley and other structures, so as to ensure a stability of rotation of the gear plate 120 under drive of the driving device.

Figure 5:
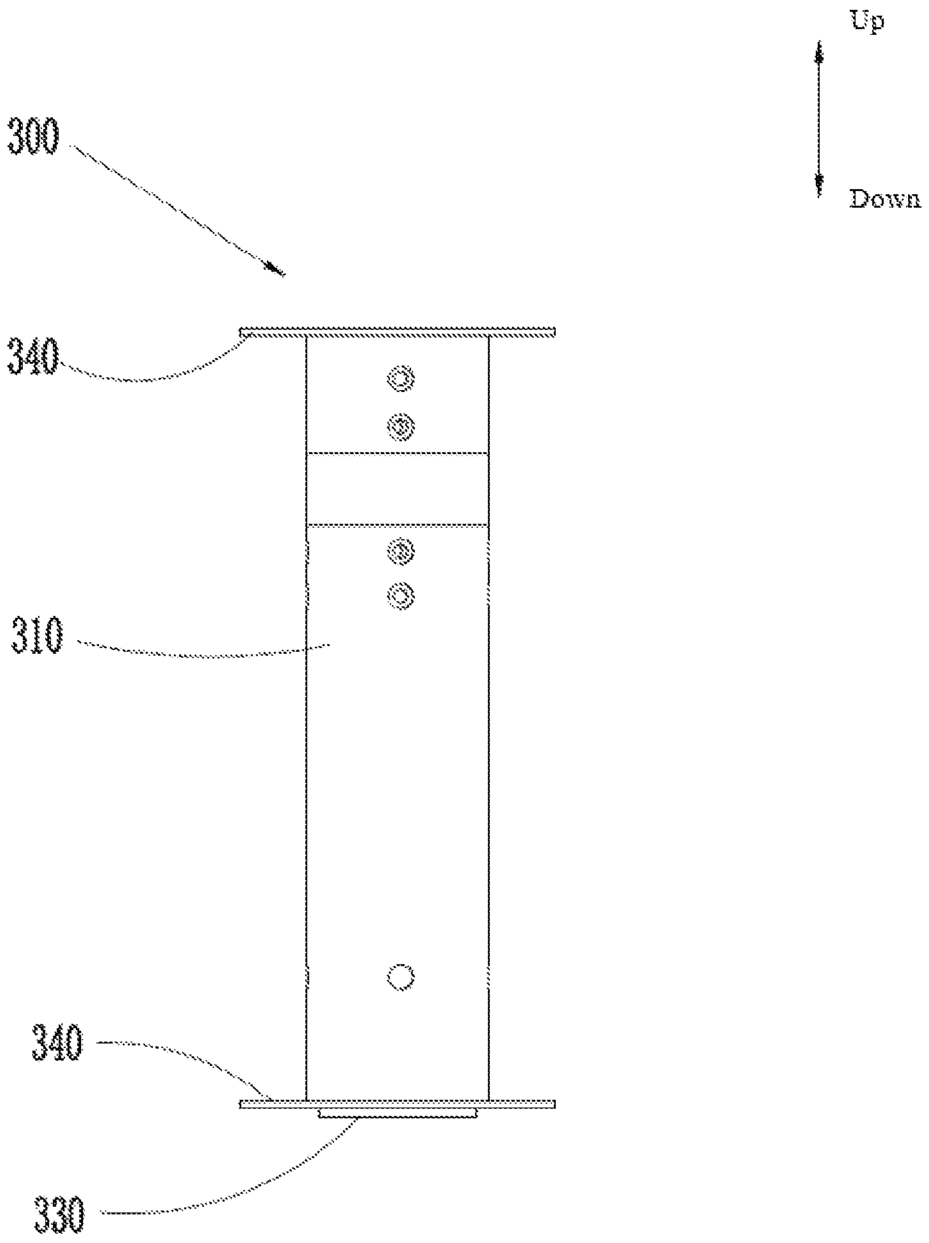
FIG. 5 is a side view of a loading assembly in FIG. 1.
Figure 6:
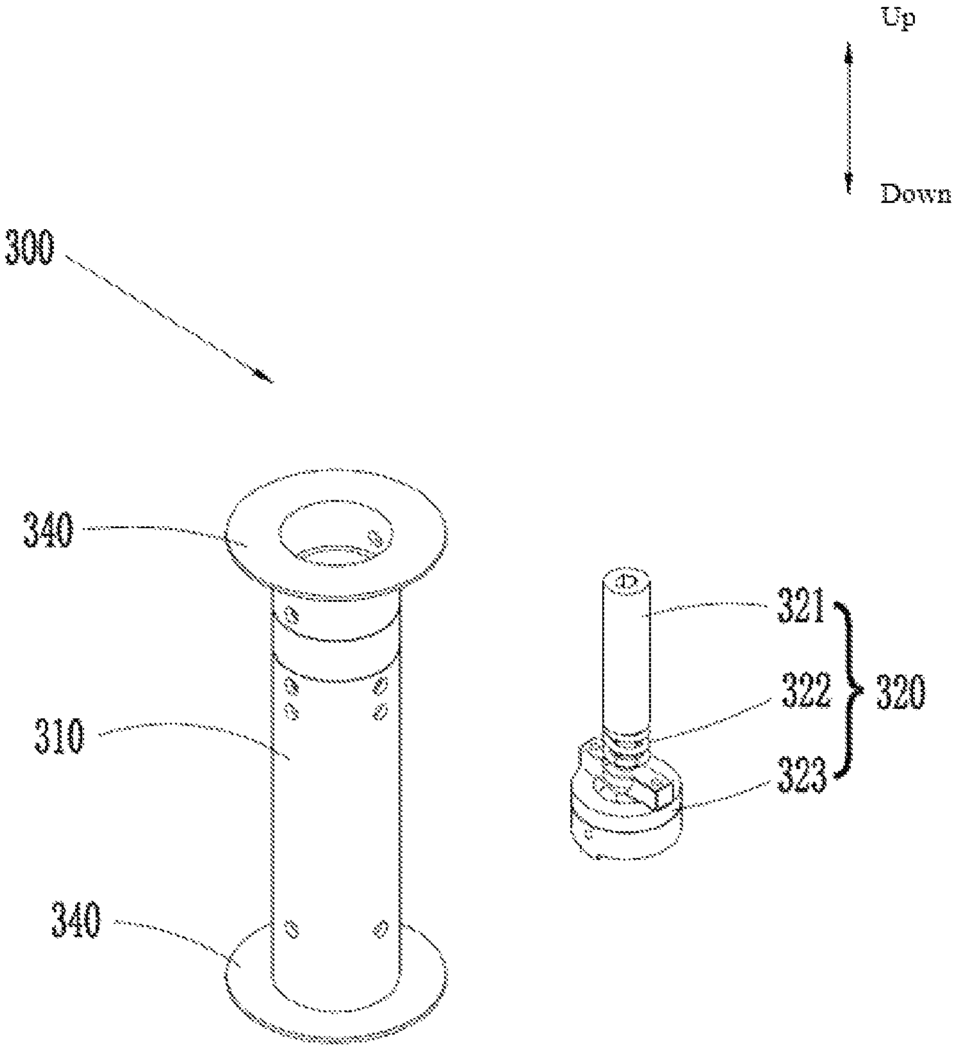
FIG. 6 is an exploded structural diagram of the loading assembly in FIG. 1.

With reference to FIG. 5 and FIG. 6, in another embodiment, the tension device 320 is located in the cylinder 310. The tension device 320 includes a push rod 321, a spring 322 and a friction block 323 attached to the cylinder 310, and two ends of the spring 322 are respectively attached to the push rod 321 and the friction block 323. By arranging the spring 322 and the friction block 323, when the cylinder 310 rotates under drive of the gear plate 120, the friction block 323 generates a friction force with the cylinder 310, and then the cylinder 310 exerts a tension on the winding material, so as to avoid dislocation of the winding material, and ensure a loading stability of the device for winding a foil coil of a stereoscopic wound iron core transformer.

In another embodiment, at least one end of the cylinder 310 is connected with the rotating assembly 100. The cylinder 310 is inserted into the gear plate 120 through a connecting portion 330 and movably connected with the rotating assembly 100. By arranging the connecting portion 330, a connection stability and disassembly convenience between the cylinder 310 and the rotating assembly 100 are improved, so as to ensure the loading stability of the device for winding a foil coil of a stereoscopic wound iron core transformer.

In another embodiment, the gear plate 120 and the track ring 130 both have an annular structure formed by combination of multiple parts. This structure is convenient for mounting and disassembling the rotating assembly 100, so as to improve use convenience of the device for winding a foil coil of a stereoscopic wound iron core transformer.

In another embodiment, upper and lower ends of the cylinder 310 are both provided with a baffle 340. By arranging the baffles 340, the cylinder 310 can conveniently and better store and guide the winding material, so as to improve a stability of the device for winding a foil coil of a stereoscopic wound iron core transformer.

In another embodiment, the rotating assembly 100 further includes a supporting plate 150. The supporting plate 150 is sleeved on an upper end of the gear plate 120 around the through hole 110. By arranging the supporting plate 150, friction between the winding material and the gear plate 120 is effectively reduced, so as to prolong a service life of the rotating assembly 100.

Figure 2:
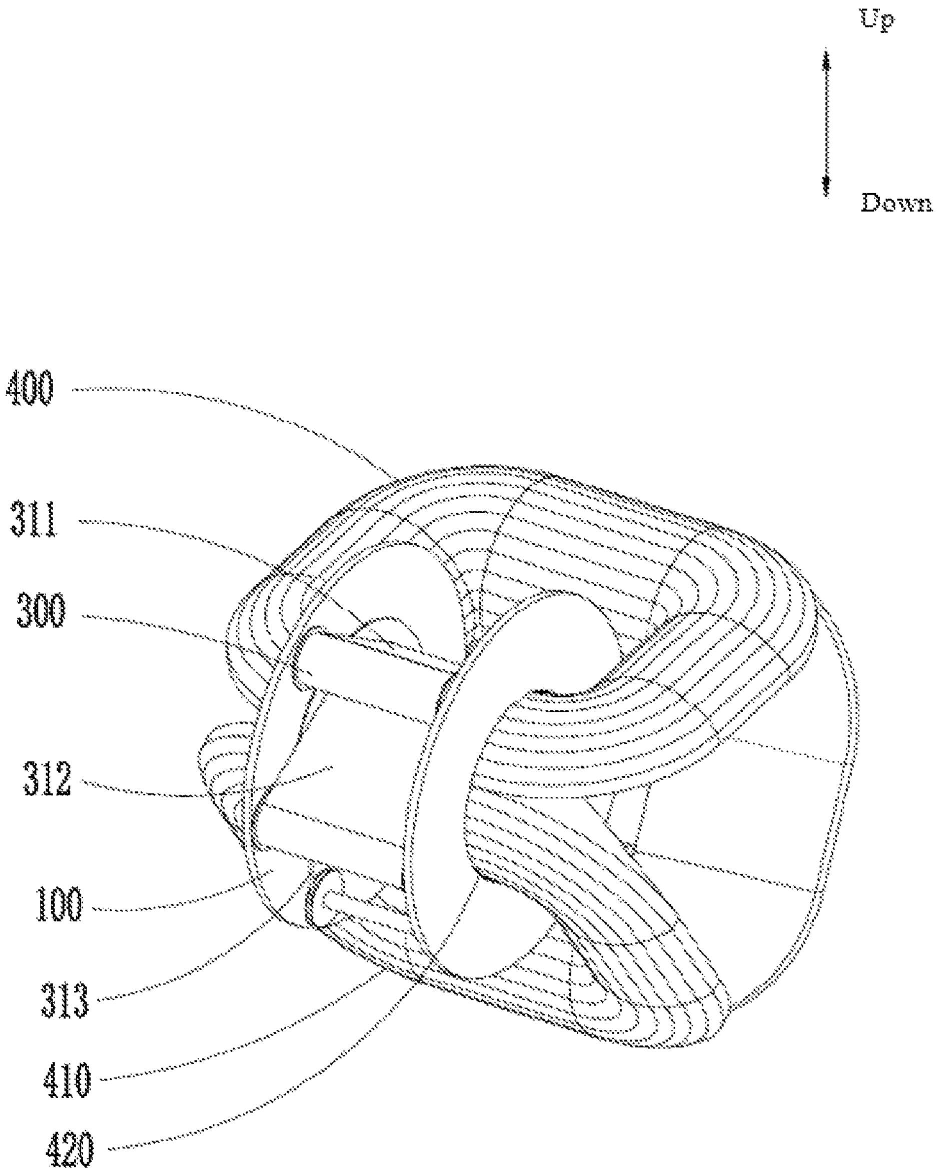
FIG. 2 is a structural diagram of a device for winding a foil coil of a stereoscopic wound iron core transformer according to another embodiment of the disclosure.
Figure 3:
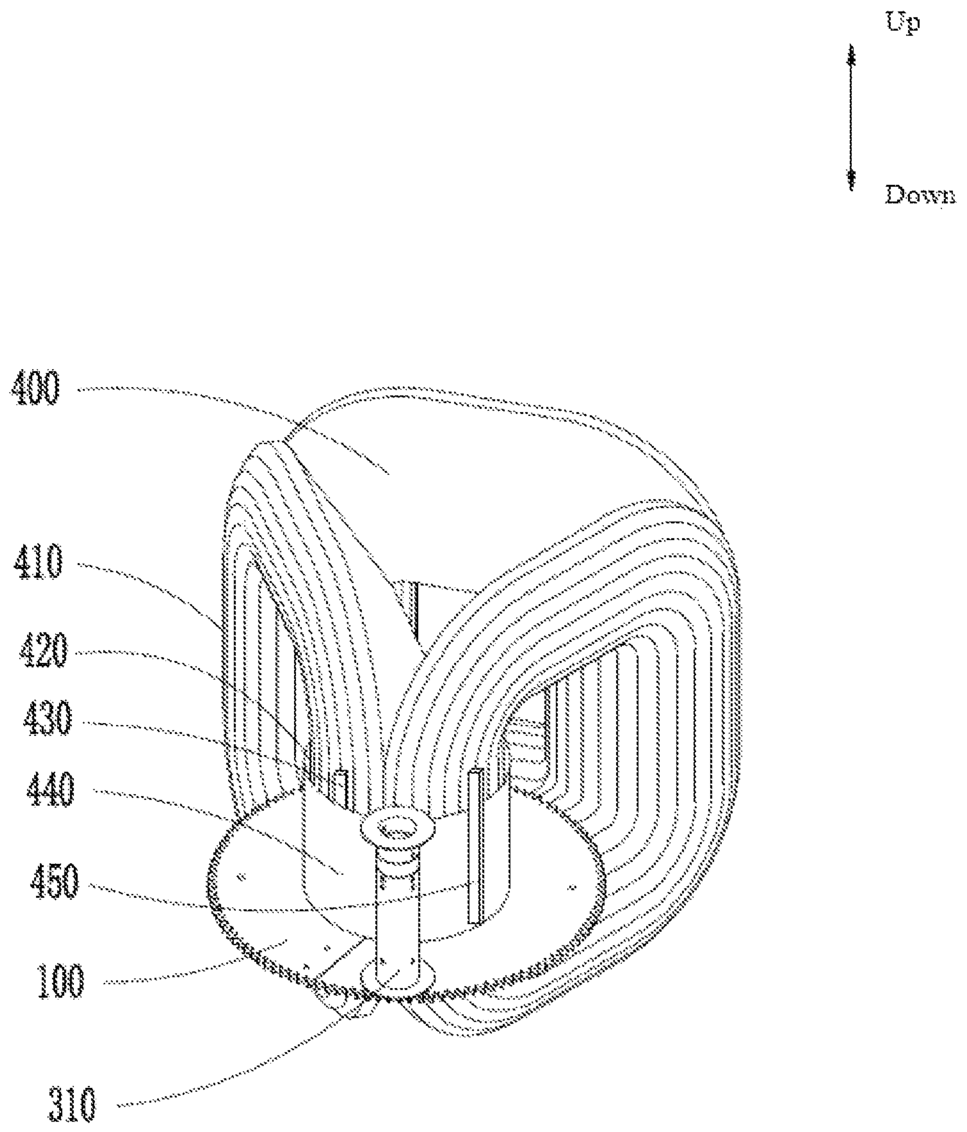
FIG. 3 is a structural diagram of a stereoscopic wound iron core and a coil body in FIG. 1.
Figure 4:
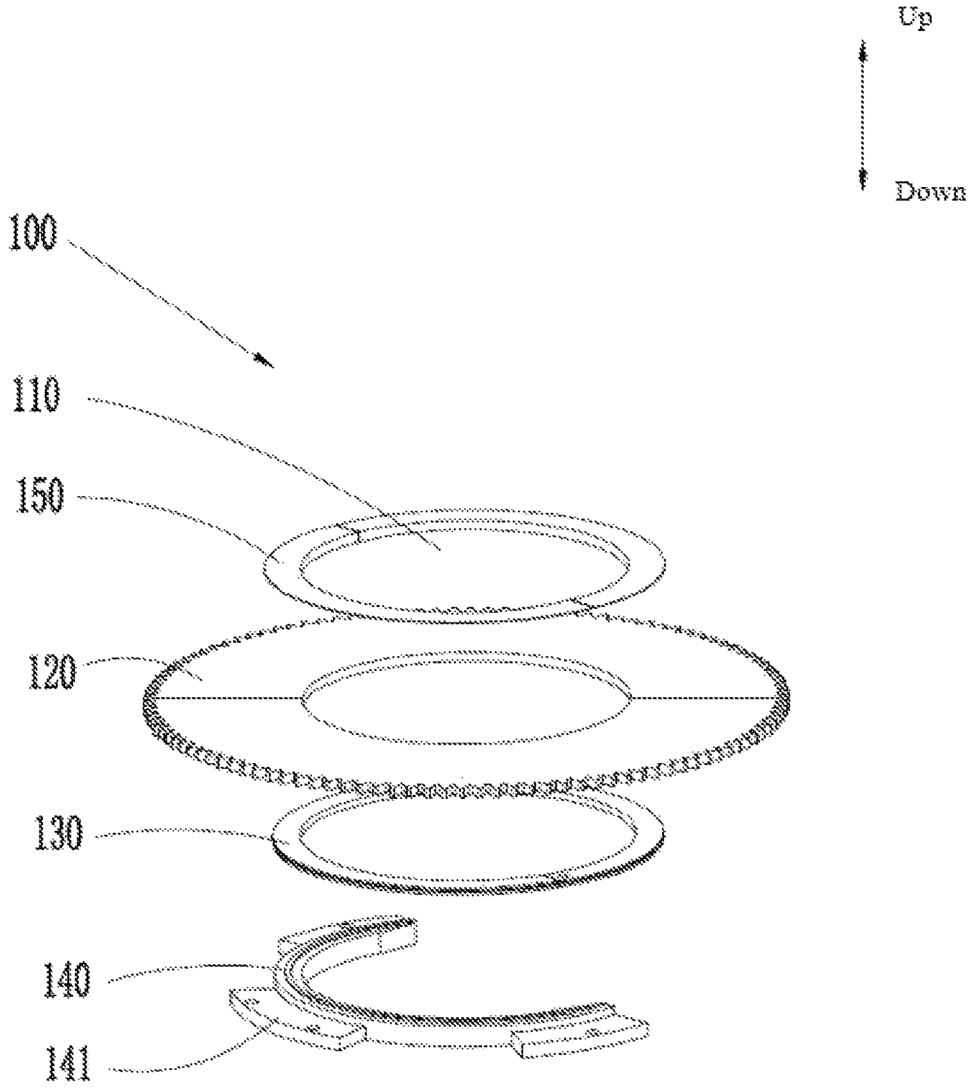
FIG. 4 is an exploded structural diagram of a rotating assembly in FIG. 1.

In another embodiment, the device for winding a foil coil of a stereoscopic wound iron core transformer provided by the disclosure can use not only vertical winding as shown in FIG. 1, but also horizontal winding as shown in FIG. 2. When the horizontal winding as shown in FIG. 2 is selected, the rotating assembly 100 needs to be provided at both ends of the cylinder 310, so as to ensure that the cylinder 310 can rotate smoothly. Compared with the horizontal winding, the vertical winding has the characteristics that a length direction of the iron core post 410 is perpendicular to a horizontal plane, with the advantage that numbers of times of turnover of the iron core post 410 and the coil body 440 can be effectively reduced, so as to improve a safety of the transformer during production.

The operating principle of the disclosure is further described hereinafter.

Before production, firstly, according to heights of the foil conductor 311, the interlayer insulator 312 and the end insulator 313, different sizes of cylinders 310 are selected, and different layers of foil conductor 311, interlayer insulator 312 and end insulator 313 are wound on the corresponding cylinders 310 according to design requirements, so that upper and lower ends of the winding material can both be attached to the baffles 340. Then, according to a specification requirement of the foil coil of the stereoscopic wound iron core transformer, the rotating assembly 100 of a corresponding specification and the cylinders 310 of a corresponding number are selected, so as to ensure that a diameter of the coil body 440 is smaller than that of the through hole 110. The insulating layer 420 is wrapped or coated on an outer wall of the iron core post 410. The gear plate 120, the track ring 130, the supporting plate 150 and other members are disassembled, and sleeved outside the insulating layer 420 in sequence, and the gear plate 120 and the track ring 130 are fixedly connected by the fixing block 140. The levelness of the rotating assembly 100 is adjusted, and the rotation smoothness of the rotating assembly 100 is checked. The fixing block 140 is fixedly mounted on the external device through the mounting portion 141, so as to ensure a concentricity between the rotating assembly 100 and the insulating layer 420. The cylinders 310 wound with the foil conductor 311, the interlayer insulator 312 and the end insulator 313 are placed in sequence, inserted into the gear plate 120 through the respective connecting portions 330, and movably connected with the rotating assembly 100. One end of each of the foil conductor 311, the interlayer insulator 312 and the end insulator 313 is fixed on the insulating layer 420, and then the inner leading wire portion 430 is arranged on an outer wall of the insulating layer 420. The driving device is started, and the rotating assembly 100 rotates and drives the cylinder 310 to rotate around the iron core post 410. The coil formed by winding the foil conductor 311 along the insulating layer 420 clamps the inner leading wire portion 430. In addition, the interlayer insulator 312 and the end insulator 313 are also wound around the outer wall of the insulating layer 420 with the iron core post 410 as a central axis to form the coil body 440. During winding, the cylinder 310 rotates around a central axis, while the cylinder 310 is driven by the rotating assembly 100 to rotate around the iron core post 410, the friction portion 323 generates a friction force with the cylinder 310, and then the cylinder 310 exerts a tension on the winding material, so as to avoid dislocation of the winding material, and ensure a winding stability of the foil conductor 311, the interlayer insulator 312 and the end insulator 313. When the coil body 440 reaches a preset thickness, or winding of the foil conductor 311 reaches a preset number of turns, the rotating assembly 100 stops rotating, and an outer leading wire portion 450 is arranged at a tail end of the foil conductor 311 far away from the inner leading wire portion 430, so as to insulate the coil body 440 and finish winding on a stereoscopic wound iron core 400. The winding of the foil coil above can be simultaneously performed on the iron core posts 410 of the stereoscopic wound iron core 400, which further improves a machining efficiency of the stereoscopic wound iron core transformer.

It can be seen from the description above that according to the method and device for winding a foil coil of a stereoscopic wound iron core transformer of the disclosure, the rotating assembly 100 is sleeved outside the iron core post 410, and drives the plurality of cylinders 310 to perform the winding operation on the iron core post 410, which effectively reduces a gap between the coil body 440 and the iron core post 410, so that not only a manually controlled process during winding of the foil coil is simplified, but also consumptions of copper material and insulating material are reduced and a production cost of the transformer is reduced. Meanwhile, a heat exchange efficiency between the coil body 440 and the iron core post 410 is improved, an anti-short circuit capability of the transformer is enhanced, a deformation amount of the coil body 440 under a radial electromotive force is reduced, and a stability of the stereoscopic wound iron core transformer is improved. The rotating assembly 100 and the cylinders 310 can be suitable for the iron core posts 410 of different sizes, thus effectively reducing accumulation of winding tooling devices, and shortening a production cycle of the stereoscopic wound iron core transformer.

The embodiments of the disclosure are described in detail with reference to the accompanying drawings above, but the disclosure is not limited to the above embodiments, and various changes may also be made within the knowledge scope of those of ordinary skills in the art without departing from the purpose of the disclosure.

The invention claimed is:

1. A method for winding a foil coil of a stereoscopic wound iron core transformer, comprising:

providing a stereoscopic wound iron core, wherein the stereoscopic wound iron core comprises a plurality of iron core posts;

providing an insulating layer, wherein the insulating layer is arranged on an outer wall of each of the iron core posts;

providing a plurality of cylinders, wherein a foil conductor, an interlayer insulator and an end insulator are respectively wound on the plurality of cylinders;

sleeving a rotating assembly outside the insulating layer;

arranging the plurality of cylinders on the rotating assembly;

fixing one end of each of the foil conductor, the interlayer insulator and the end insulator on the insulating layer;

arranging an inner leading wire portion at one end of the foil conductor connected with the insulating layer;

connecting and starting a driving device, wherein the driving device drives the rotating assembly to rotate, so as to drive the plurality of cylinders to rotate around the respective of the iron core posts, and the foil conductor, the interlayer insulator and the end insulator are all wound on an outer wall of the insulating layer with the respective of the iron core post as a central axis to form a coil body; and arranging an outer leading wire portion at one end of the foil conductor far away from the inner leading wire portion.

2. The method for winding a foil coil of a stereoscopic wound iron core transformer of claim 1, wherein the insulating layer is wrapped or coated on the outer wall of the iron core post.

3. The method for winding a foil coil of a stereoscopic wound iron core transformer of claim 2, wherein a distance between an inner wall of the coil body and the outer wall of the insulating layer ranges from 0 mm to 1.5 mm.

4. The method for winding a foil coil of a stereoscopic wound iron core transformer of claim 1, wherein after sleeving the rotating assembly outside the insulating layer, the method comprises: adjusting a levelness of the rotating assembly; checking a rotation smoothness of the rotating assembly; and fixing the rotating assembly on an external device by a fixing block.

5. The method for winding a foil coil of a stereoscopic wound iron core transformer of claim 1, wherein the foil conductor, the interlayer insulator and the end insulator have a multi-layer structure; and numbers of layers of each of the foil conductor, the interlayer insulator and the end insulator are adjusted according to a performance requirement of the coil body.

6. A device for winding a foil coil of a stereoscopic wound iron core transformer, comprising: a rotating assembly; a driving device; and a plurality of loading assemblies, wherein the rotating assembly is provided with a through hole matched with an iron core post, and the rotating assembly is provided with a gear plate and a track ring around the through hole; the gear plate and the track ring are fixedly connected by a fixing block; each of the loading assemblies comprises a cylinder and a tension device, and the cylinder is movably connected with the rotating assembly; and a driving end of the driving device is connected with the gear plate.

7. The device for winding a foil coil of a stereoscopic wound iron core transformer of claim 6, wherein the tension device is located in the cylinder; the tension device comprises a push rod, a spring and a friction block attached to the cylinder, and two ends of the spring are respectively attached to the push rod and the friction block.

8. The device for winding a foil coil of a stereoscopic wound iron core transformer of claim 7, wherein at least one end of the cylinder is connected with the rotating assembly; and the cylinder is inserted into the gear plate through a connecting portion and movably connected with the rotating assembly.

9. The device for winding a foil coil of a stereoscopic wound iron core transformer of claim 6, wherein the gear plate and the track ring both have an annular structure formed by combination of multiple parts.

* * * * *